(12) United States Patent
Katayama

(10) Patent No.: US 10,087,033 B2
(45) Date of Patent: *Oct. 2, 2018

(54) PAPER POST-PROCESSING APPARATUS AND PAPER POST-PROCESSING METHOD

(71) Applicants: KABUSHIKI KAISHA TOSHIBA, Minato-ku, Tokyo (JP); TOSHIBA TEC KABUSHIKI KAISHA, Shinagawa-ku, Tokyo (JP)

(72) Inventor: Yosuke Katayama, Shizuoka (JP)

(73) Assignees: KABUSHIKI KAISHA TOSHIBA, Tokyo (JP); TOSHIBA TEC KABUSHIKI KAISHA, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 15/422,643

(22) Filed: Feb. 2, 2017

(65) Prior Publication Data

US 2017/0144854 A1    May 25, 2017

Related U.S. Application Data

(63) Continuation of application No. 14/597,369, filed on Jan. 15, 2015, now Pat. No. 9,598,258.

(51) Int. Cl.
    *B32B 41/00*    (2006.01)
    *B65H 37/04*    (2006.01)
    (Continued)

(52) U.S. Cl.
    CPC .............. *B65H 37/04* (2013.01); *B32B 9/06* (2013.01); *B32B 37/0046* (2013.01);
    (Continued)

(58) Field of Classification Search
    CPC ........ B65H 37/04; B65H 37/02; B65H 31/26; B65H 39/10; B32B 7/045; B32B 7/08;
    (Continued)

(56) References Cited

U.S. PATENT DOCUMENTS

| | | | |
|---|---|---|---|
| 9,598,258 B2 * | 3/2017 | Katayama | ................ B42B 9/06 |
| 2009/0261521 A1 | 10/2009 | Okamoto et al. | |
| 2014/0001693 A1 | 1/2014 | Ishizuka | |

FOREIGN PATENT DOCUMENTS

JP    2005-074858    3/2005

OTHER PUBLICATIONS

Non-Final Office Action for U.S. Appl. No. 14/597,369 dated Apr. 18, 2016, 19 pages.

* cited by examiner

*Primary Examiner* — Michael N Orlando
*Assistant Examiner* — Joshel Rivera
(74) *Attorney, Agent, or Firm* — Amin, Turocy & Watson LLP

(57) ABSTRACT

A post-processing apparatus comprises a first processing tray on which fed paper is placed; a paper binding section configured to bind a plurality of sheets of paper stacked on the first processing tray into one bundle; a second processing tray which a plurality of paper bundles bound on the first processing tray are sequentially conveyed to and placed on; a paper bundle gluing section configured to coat glue at a given position of the top surface of a first paper bundle placed on the second processing tray before a second paper bundle is placed on the first paper bundle; a pressing section configured to press and bind the first paper bundle with the second paper bundle between which glue is coated; and a control section configured to control the timing for conveying the second paper bundle onto the first paper bundle after the glue is coated.

7 Claims, 8 Drawing Sheets

(51) Int. Cl.
*B42C 1/12* (2006.01)
*B65H 31/10* (2006.01)
*B65H 37/02* (2006.01)
*B32B 9/06* (2006.01)
*B32B 37/00* (2006.01)
*B32B 37/10* (2006.01)
*B32B 37/12* (2006.01)
*B32B 37/18* (2006.01)
*B32B 38/18* (2006.01)
*G03G 15/00* (2006.01)

(52) U.S. Cl.
CPC .......... *B32B 37/0076* (2013.01); *B32B 37/10* (2013.01); *B32B 37/12* (2013.01); *B32B 37/18* (2013.01); *B32B 38/18* (2013.01); *B32B 41/00* (2013.01); *B42C 1/12* (2013.01); *B65H 31/10* (2013.01); *B65H 37/02* (2013.01); *G03G 15/6544* (2013.01); *B32B 2255/12* (2013.01); *B32B 2309/70* (2013.01); *B32B 2317/12* (2013.01); *B32B 2429/00* (2013.01); *B65H 2301/4223* (2013.01); *B65H 2301/43827* (2013.01); *B65H 2511/30* (2013.01); *B65H 2701/1829* (2013.01); *B65H 2701/18292* (2013.01); *B65H 2801/27* (2013.01)

(58) Field of Classification Search
CPC .. B32B 9/06; B32B 7/12; B32B 37/12; B32B 38/18; B32B 41/00; B32B 37/0076; B32B 37/18; B32B 37/0046; B32B 37/10; B32B 2317/12; B32B 2309/70; B32B 2255/12; B32B 2429/00
USPC .......... 156/64, 350, 351, 368, 369, 378, 379
See application file for complete search history.

PAPER POST-PROCESSING APPARATUS AND PAPER POST-PROCESSING METHOD

CROSS-REFERENCE TO RELATED APPLICATIONS

This application is a Continuation of application Ser. No. 14/597,369 filed on Jan. 15, 2015, the entire contents of which are incorporated herein by reference.

FIELD

Embodiments described herein relate generally to a post-processing technology for binding a plurality of sheets of printed paper.

BACKGROUND

Conventionally, a post-processing apparatus connected with an image forming apparatus is provided with a binding section which binds a plurality of sheets printed paper into a bundle. As to the binding method in the binding section, a needle binding method and a gluing method are proposed.

The needle-binding type binding section arranged in the post-processing apparatus pierces a plurality of sheets of paper stacked on a processing tray with staples to bind the plurality of sheets of paper. When printed paper is stacked on the processing tray, the gluing-binding type binding section pastes glue to a given position of the paper and then places next printed paper on the paper.

In the needle-binding type binding section, the number of paper that can be bound at one time is limited according to the length of the used staple needle. Generally, as to the space above the processing tray, the rear side (opposite to the sheet discharge side) of the processing tray where the staple binding section is arranged is narrower than the front side (sheet discharge side) of the processing tray. Further, the paper binding section is generally arranged at the rear side of the processing tray. Thus, the maximum binding number of the binding section is limited.

Incidentally, when the number of paper that is fed from the image forming apparatus and is to be bound into one bundle is larger than the number of paper that can be bound into one bundle by the post-processing apparatus, neither the needle binding processing nor the glue binding processing can be carried out. Thus, it is desired that the paper can be bound into one bundle even if the printing number is larger than the number of paper that can be bound at one time.

DETAILED DESCRIPTION

In accordance with one embodiment, a post-processing apparatus comprises a first processing tray on which fed paper is placed; a paper binding section configured to bind a plurality of sheets of paper stacked on the first processing tray into one bundle; a second processing tray which paper bundles subjected to binding processing on the first processing tray are sequentially conveyed to and placed on; a paper bundle gluing section configured to carry out gluing processing at a given position of the upmost paper of a first paper bundle placed on the second processing tray before a next second paper bundle is placed on the first paper bundle; a pressing section configured to press the first paper bundle and the second paper bundle between which glue is coated to carry out glue binding processing; and a control section configured to control the conveyance timing for conveying the second paper bundle onto the first paper bundle after the gluing processing is carried out by the gluing section.

In accordance with one embodiment, a post-processing method for binding fed paper includes comparing the total number of fed paper with a preset threshold value and calculating the number of paper in each of a plurality of divided paper bundles in a range that does not exceed the threshold value in a case in which the total number of paper is larger than the threshold value; carrying out binding processing on the plurality of paper bundles based on the calculated number; carrying out gluing processing on the last page of a first paper bundle; placing the first page of a second paper bundle on the glue coated part of the last page of the first paper bundle; and pressing the first paper bundle and the second paper bundle between which the glue is coated to carry out glue binding processing.

Hereinafter, the post-processing apparatus according to the present embodiment is described in detail with reference to the accompanying drawings.

(A First Embodiment)

Figure 1:
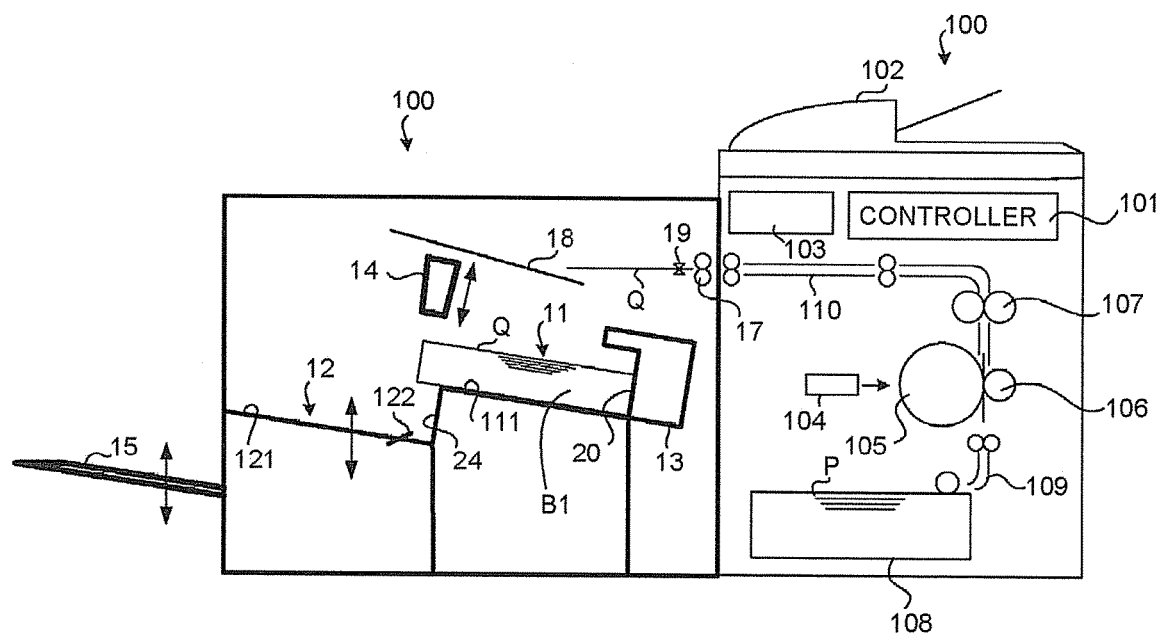
FIG. 1 is a schematic view illustrating a post-processing apparatus according to a first embodiment and a state in which the post-processing apparatus is connected with an image forming apparatus.
Figure 2:
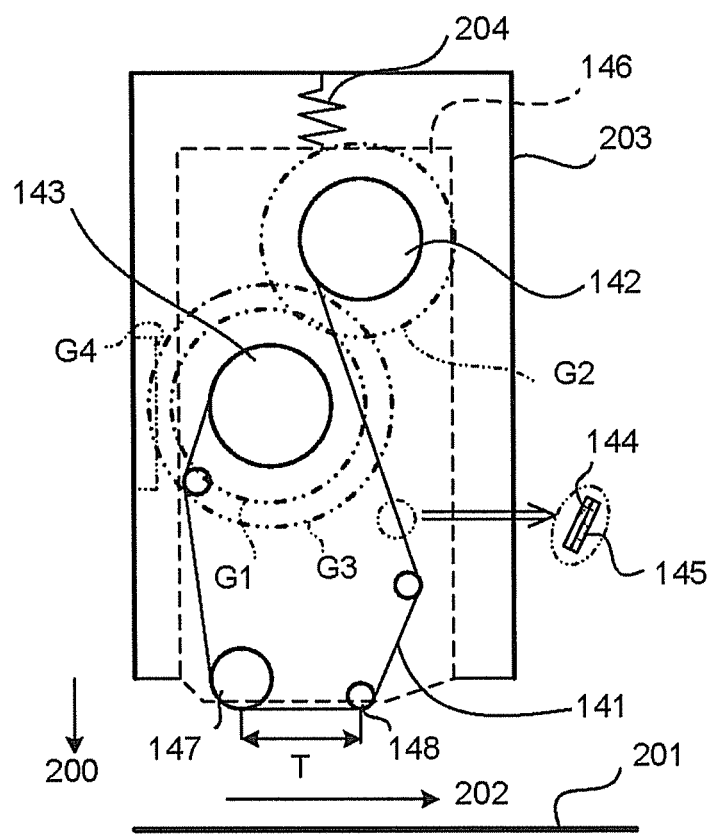
FIG. 2 is a schematic front view illustrating a gluing section shown in FIG. 1.
Figure 3:
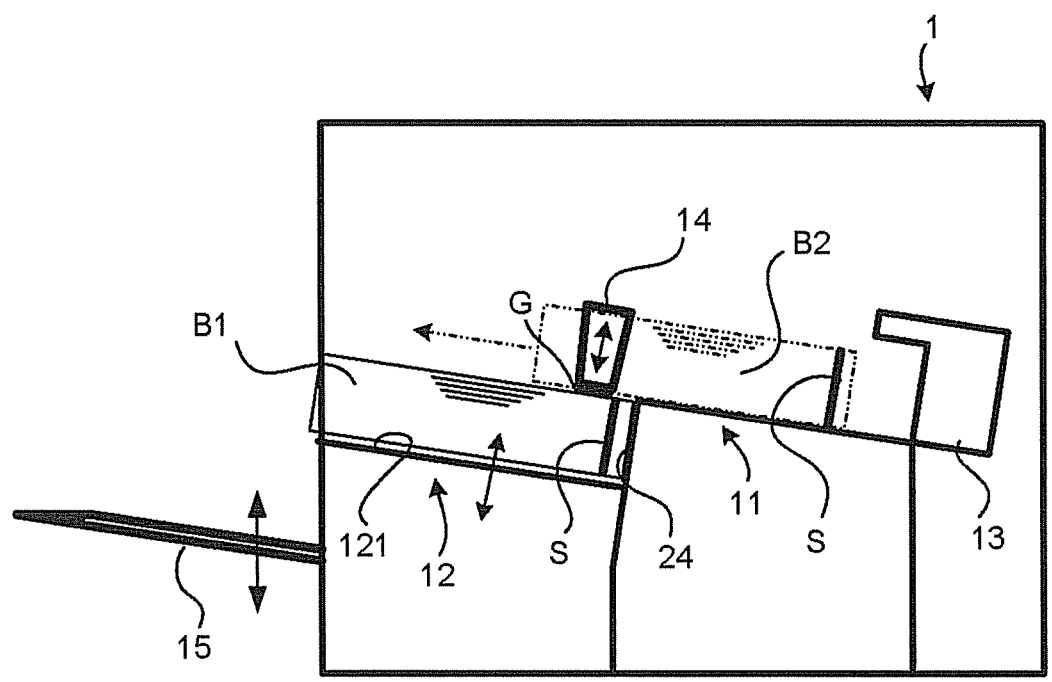
FIG. 3 is a schematic view illustrating a state in which a first paper bundle subjected to stapling processing shown in FIG. 1 is placed on a second processing tray.
Figure 4:
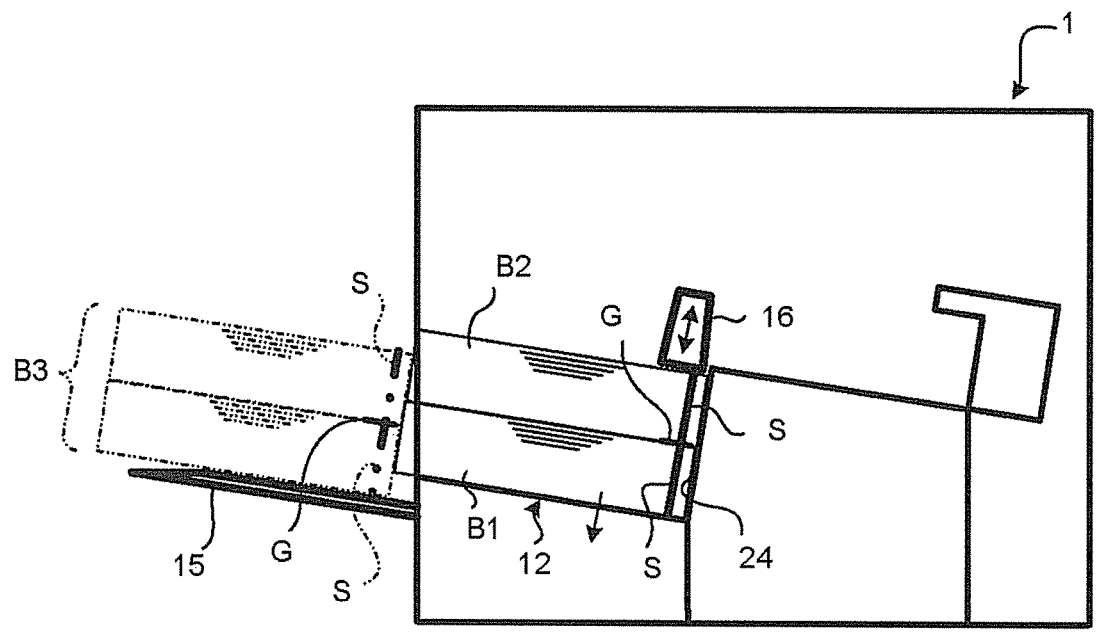
FIG. 4 is a schematic view illustrating a state in which a second paper bundle is placed on the first paper bundle placed on the second processing tray shown in FIG. 3.

FIG. 1 is a schematic view illustrating the post-processing apparatus according to the first embodiment and a state in which the post-processing apparatus is connected with an image forming apparatus. FIG. 2 is a schematic front view illustrating a gluing section shown in FIG. 1. FIG. 3 is a schematic view illustrating a state in which a first paper bundle subjected to stapling processing shown in FIG. 1 is placed on a second processing tray. FIG. 4 is a schematic view illustrating a state in which a second paper bundle is placed on the first paper bundle placed on the second processing tray shown in FIG. 3.

In FIG. 1-FIG. 4, a post-processing apparatus 1 is connected with an image forming apparatus 100. A controller 101 of the image forming apparatus 100 controls the whole post-processing apparatus 1. The post-processing apparatus 1 is controlled by the controller 101 of the image forming apparatus 100, however, a controller may be arranged in the post-processing apparatus 1 to control the post-processing apparatus 1.

In the image forming apparatus 100, such a case is exemplified in which a document stacked on, for example, an automatic document feeder (ADF) 102 is copied and the printed paper is bound into one bundle through the post-processing apparatus 1.

A user turns on a post-processing switch (not shown) of an operation section 103 and turns on a copy switch (not shown). The controller 101 drives the ADF 102 if acquiring an ON signal of the copy switch. The ADF 102 continuously conveys the stacked documents to a scanner (not shown) to read a document image with the scanner. The document image read by the scanner is stored in a storage (not shown). Meanwhile, the controller 101 counts the number of the documents read by the scanner and records it in a memory. At this time, the counted document number is regarded as a print instruction number (X).

When the start of printing is instructed from the controller 101, a photoconductive drum 105 is exposed with the image exposure light from, for example, a laser image exposure section 104 to form an electrostatic latent image. The electrostatic latent image is developed by a developing device (not shown) to form a toner image. The toner image on the photoconductive drum 105 is transferred to a printing paper P at a transfer position where the photoconductive drum 105 is contacted with a transfer roller 106. The toner image transferred to the printing paper P is heated and pressed by a fixing section 107 to be fixed on the printing paper P. The printing paper P is conveyed from a paper feed cassette 108 in which a plurality of sheets of paper P are stored via a paper conveyance path 109 to the transfer position.

The printed paper Q subjected to fixing processing is discharged from the image forming apparatus 100 via a discharge conveyance path 110 and conveyed to the post-processing apparatus 1 with the printed surface facing downwards. In addition, the image forming apparatus 100 carries out printing sequentially from the first page.

The post-processing apparatus 1 includes a first processing tray 11, a second processing tray 12, a stapling section 13, a paper bundle gluing section 14, a paper discharge tray 15 and a paper bundle pressing section 16 (refer to FIG. 4). Further, the post-processing apparatus 1 temporarily feeds the printed paper Q, which is discharged from the image forming apparatus 100, to an intermediate tray 18 from a paper feed roller 17. The intermediate tray 18 consists of a pair of separate trays which face each other along a width direction orthogonal to the conveyance direction of the paper Q, and when the pair of separate trays moves away from each other in the width direction, the one or the plurality of sheets of paper Q stacked on the intermediate tray 18 drops down to the first processing tray 11 arranged below. The one or the plurality of sheets of paper Q may be directly dropped down to the first processing tray 11 from the paper feed roller 17 without being temporarily stacked on the intermediate tray 18.

The paper Q fed from the paper feed roller 17 to the intermediate tray 18 is detected by a paper sensor 19 serving as a discharged paper number counter section, and the number of the fed paper Q is counted. In addition, the paper sensor 19 may be arranged on the discharge conveyance path 110 of the image forming apparatus 1.

A paper placing surface 111 of the first processing tray 11 is arranged in an inclined manner so that the rear end in the conveyance direction of the stacked paper Q is abutted against and aligned by a first end alignment surface 20 of the stapling section 13. Further, the paper Q dropped down from the intermediate tray 18 is conveyed (moved) towards the first end alignment surface (position) 20 by a rotation member (not shown) which is in frictional contact with the upper surface of the paper Q.

The stapling section 13 carries out needle binding processing at a preset binding position with a staple S when the number of the paper Q stacked on the first processing tray 11 reaches a given number. The needle binding processing with the staples S is carried out on a corner of the paper Q or a plurality of positions in the width direction at the rear end in the conveyance direction of the paper Q.

The first processing tray 11 is provided with a first conveyance section 21 (refer to FIG. 5) which conveys the stapled paper bundle stacked on the first processing tray 11 to the second processing tray 12. In a state in which there is no paper bundle stacked on the second processing tray 12, the paper bundle conveyed from the first processing tray 11 to the second processing tray 12 is referred to as a first paper bundle B1. Further, in a state in which the first paper bundle B is stacked on the second processing tray 12, the paper bundle conveyed from the first processing tray 11 to the second processing tray 12 is referred to as a second paper bundle B2.

After conveying the first paper bundle B1 subjected to the stapling processing on the first paper tray 11 to the second processing tray 12, the post-processing apparatus 1 continues to stack the next paper Q on the first processing tray 11, carry out stapling processing and then convey the second paper bundle B2 to the second processing tray 12.

Similar to the first processing tray 11, a paper placing surface 121 of the second processing tray 12 is also formed into an inclined surface which is inclined upwards towards the front side of the conveyance direction. The second processing tray 12 is arranged in such a manner that the paper placing surface 121 thereof can be lifted and lowered through a second processing tray lifting and lowering section 23 (refer to FIG. 5). As shown in FIG. 1, in a state in which there is no paper bundle stacked on the second processing tray 12, the paper placing surface 121 of the second processing tray 12 is positioned at a standby position below the paper discharge end of the paper placing surface 111 of the first processing tray 11. In addition, a paper bundle existence sensor 122 is arranged on the paper placing surface 121 of the second processing tray 12 to detect whether or not the first paper bundle B1 is stacked. As shown in FIG. 3, the standby position is such a position at which the top surface of the stacked first paper bundle B1 is below the paper placing surface 111 of the first processing tray 11.

The first paper bundle B1 stacked on the paper placing surface 121 of the second processing tray 12 slips off from the inclined paper placing surface 121, and the rear end in the conveyance direction abuts against a second end alignment surface 24 and stops.

When the first paper bundle B1 conveyed from the first processing tray 11 is stacked on the paper placing surface 121 of the second processing tray 12, as shown in FIG. 3, the paper bundle gluing section 14 carries out gluing processing on the upmost paper Q of the first paper bundle B1. Though the gluing position where glue G is adhered is corresponding to the needle binding position based on the stapling section 13, the gluing processing is carried out on a position which does not overlap with the staple S. For example, in a case of carrying out needle binding processing with the staple at one position at the corner of the first paper bundle B1, the gluing processing is carried out at the corner of the paper Q while the gluing position does not overlap with the position of the staple.

The paper bundle gluing section 14 includes liquid, solid or tape-shaped glue. The paper bundle gluing section 14 held by a first moving mechanism 25 (refer to FIG. 5) moves to adhere the glue G on the surface of the paper Q. The first moving mechanism 25 retracts the paper bundle gluing section 14 to a retracting position so as not to interfere with the conveyance of each of the first paper bundle B1 and the second paper bundle B2 from the first processing tray 11 to the second processing tray 12. Then the first moving mechanism 25 moves the paper bundle gluing section 14 from the retracting position to the gluing position in a case of carrying out gluing processing to adhere the glue G on the back surface of the upmost paper (the last page of the first paper bundle B1) of the first paper bundle B1.

The paper bundle gluing section 14 is shown in FIG. 2. The paper bundle gluing section 14 shown in FIG. 2 uses a pressure-sensitive transfer type adhesive tape (hereinafter, referred to as adhesive tape for short) 141 as the glue. The adhesive tape 141 is wound on a feeding reel 142 in a roll shape, and the other end of the adhesive tape 141 is wound on a winding reel 143. The adhesive tape 141 is constituted by adhering a base material 145 serving as the glue to the single side of a roll film 144 across an adhesive layer in a peelable manner. The base material 145, which is a double-sided adhesive, is peeled off from the roll film 144 at a transfer area where the adhesive is transferred to the adhered surface.

The feeding reel 142 and the winding reel 143 are rotatably supported by a substrate 146, and the adhesive tape 141 is stretched by rollers 147 and 148 arranged at the front end of the substrate 146. The length between the roller 147 and the roller 148 serves as the pressing transfer area T; if the substrate 146 is pressed in a direction indicated by an arrow 200, the base material 145 of the adhesive tape 141 is pressed against a transfer surface 201, and then the substrate 146 is returned upwards, the base material 145 in the pressing transfer area T is transferred to the transfer surface 201. Further, if the substrate 146 is slide in a direction indicated by an arrow 202 in a state in which the base material 145 is pressed against the transfer surface 201 and then returned upwards, the base material 145 is transferred to the transfer surface 201 for a length equal to the sliding length.

In the present embodiment, the substrate 146 is arranged to be capable of moving upwards or downwards in an outer case 203. A spring member 204 energizes the substrate 146 towards the middle and lower portion of the figure with respect to the outer case 203. A first gear G1 is fixed on the winding reel 143 in a coaxial manner, and a second gear G2 is fixed on the feeding reel 142 in a coaxial manner. The first gear G1 and the second gear G2 mesh with each other. Thus, when the adhesive tape 141 is pulled in the winding direction, the first gear G1 is rotated anticlockwise, and the winding reel 143 is rotated clockwise together with the second gear G2, in this way, the adhesive tape 141 is wound on the winding reel 143.

A third gear G3 is arranged on the winding reel 143 through a one-way clutch mechanism (not shown) in the manner of being coaxial with the first gear G1. A rack gear G4 is arranged on the inner surface of the case 203. The third gear G3 meshes with the rack gear G4.

When the third gear G3 is rotated clockwise, the one-way clutch connects the third gear G3 with the winding reel 143, and the winding reel 143 winds the adhesive tape 141 through the rotation force of the third gear G3.

On the contrary, when the winding reel 143 is rotated clockwise, the one-way clutch releases the connection between the third gear G3 and the winding reel 143, and only the winding reel 143 is rotated in the winding direction.

When the substrate 146 is pressed downwards under the spring force of the spring member 204 with respect to the outer case 203, the third gear G3 is rotated clockwise through the meshing with the rack gear G4, and in this way, the adhesive tape 141 is wound on the winding reel 143. That is, after the transfer of the base material 145, when the outer case 203 is moved upwards, the substrate 146 is pressed downwards under the spring force of the spring member 204, and at the same time, the adhesive tape 141 is wound on the winding reel 143 for a given amount, and the base material 146 is positioned in the pressing transfer area T.

Further, when the paper bundle gluing section 14 is slide in the direction indicated by the arrow 202 to carry out gluing processing, even if the rotation force in the winding direction is applied to the winding reel 143, the winding reel 143 is not connected with the third gear G3 due to the action of the one-way clutch, thus, the winding reel 143 can be rotated freely.

As shown in FIG. 3, the second paper bundle B2 of the first processing tray 11 is conveyed onto the first paper bundle B1. The second processing tray 12 lowers the paper placing surface 121 through the second processing tray lifting and lowering section 23 to carry out a position alignment so that the upmost paper Q of the second paper bundle B2 is at the same level with the paper placing surface 111 of the first processing tray 11. In this state, the rear ends in the conveyance direction of the first paper bundle B1 and the second paper bundle B2 abut against the second end alignment surface 24 and the ends are aligned. In this state, the second paper bundle B2 is in contact with the glue G of the first paper bundle B1 under its own weight.

As shown in FIG. 4, the paper bundle pressing section 16 contacts with the upmost paper Q of the second paper bundle B2 and presses the second paper bundle B2 downwards. Similar to the paper bundle gluing section 14, the paper bundle pressing section 16 is held by, for example, a second moving mechanism 26 (not shown), and is retracted to a retracting position by the second moving mechanism 26 so as not to interfere with the conveyance of each of the first paper bundle B1 and the second paper bundle B2 from the first processing tray 11 to the second processing tray 12. The paper bundle pressing section 16 may generate the pressure force using the force generated when the second moving mechanism 26 moves downwards.

The lowermost paper Q of the second paper bundle B2 is pressed on the glue G of the first paper bundle B1, thus, the second paper bundle B2 and the first paper bundle B1 are subjected to strong gluing processing, and in this way, the two stapled paper bundles are bound into one paper bundle (paper bundle B3).

The paper bundle B3 subjected to glue binding processing on the second processing tray 12 is discharged to the paper discharge tray 15 through a second conveyance section 22 (refer to FIG. 5) arranged in the second processing tray 12.

In the present embodiment, the first paper bundle B1 and the second paper bundle B2 are processed separately because the print instruction number (X) (that is, the number of the documents read by the ADF) is larger than a maximum number (N) indicating the maximum number of paper that can be stapled by the stapling section 13 at one time.

It is assumed in the present embodiment that the relation between N and X meets the following condition: $N<X\leq 2N$; in a case in which X is an odd number, either of the number of paper of the first paper bundle B1 or the number of paper of the second paper bundle B2 is one larger than the other; and in a case in which X is an even number, the paper is divided into two even halves. A division threshold value N serving as a threshold value for determining whether or not to divide the paper bundle into a plurality of paper bundles (for example, the first paper bundle and the second paper bundle) may be a value that can be changed by the user by taking the preset maximum processable number as the upper limit.

Figure 5:
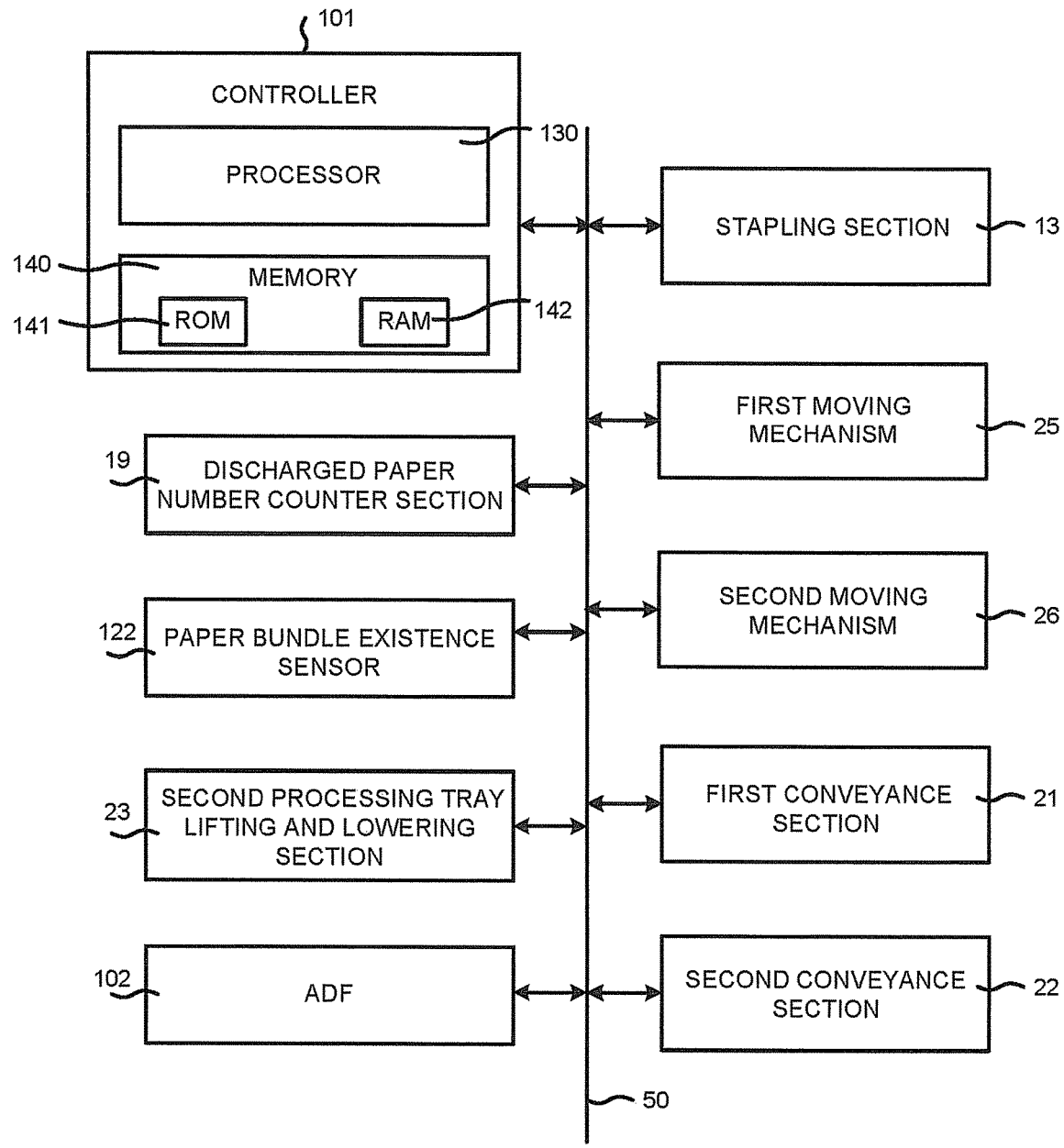
FIG. 5 is a block diagram illustrating the hardware constitution of the post-processing apparatus according to the first embodiment.

FIG. 5 is a block diagram illustrating the hardware constitution of the post-processing apparatus 1.

The controller 101, the discharged paper number counter section 19, the paper bundle existence sensor 122, the second processing tray lifting and lowering section 23, the ADF 102, the stapling section 13, the first moving mechanism 25, the second moving mechanism 26, the first conveyance section 21 and the second conveyance section 22 are connected with each other through a bus line 50.

The controller 101 operates the ADF 102 and acquires the print instruction number (X) from the scanner and the like. In a case of printing the printing data sent from a personal computer, the print instruction number (X) is acquired from the page number in the printing data. In a case in which the stapling processing based on the post-processing apparatus 1 is instructed, the controller 101 staples the printed paper Q on the first processing tray 11 with the stapling section 13.

The controller 101 determines whether or not it is necessary to carry out a dividing processing and calculates the number of paper of each paper bundle to be divided, according to the print instruction number (X) and the division threshold value (N).

The controller 101 includes a processor 130 including a CPU (Central Processing Unit) or an MPU (Micro Processing Unit) and a memory 140.

The memory 140, which is, for example, a semiconductor memory, includes an ROM (Read Only Memory) 141 for storing various control programs and an RAM (Random Access Memory) 142 for providing a temporary work area for the processor 130. For example, the ROM 141 stores the division threshold value N, a formula for dividing the number of paper of each of the first paper bundle B1 and the second paper bundle B2, and the like.

Figure 6:
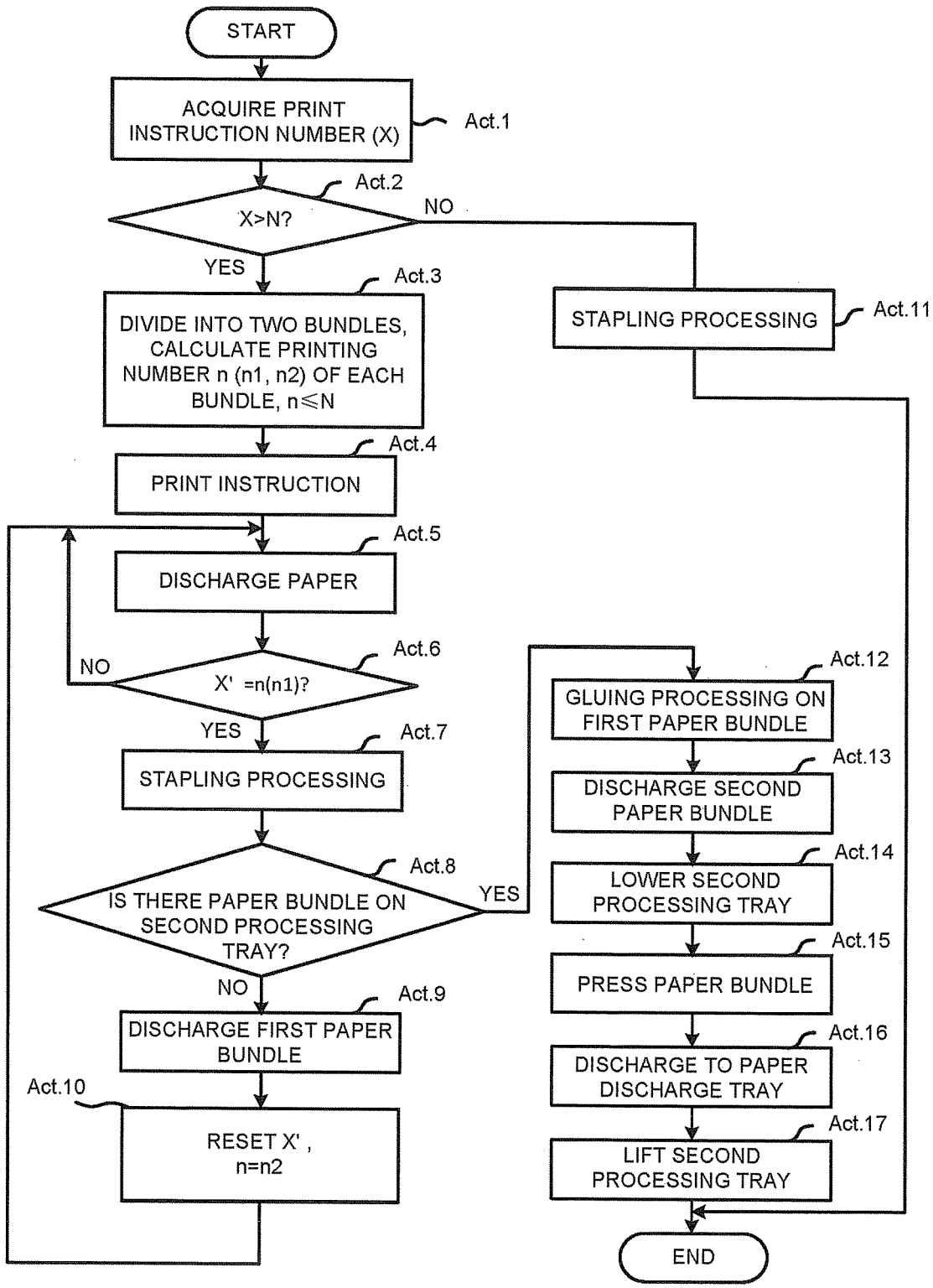
FIG. 6 is a flowchart illustrating post-processing carried out through the hardware constitution shown in FIG. 5.

The post-processing carried out through the hardware constitution shown in FIG. 5 is described with reference to the flowchart in FIG. 6.

The print instruction number (X) is acquired in ACT 1, and then ACT 2 is taken.

In ACT 2, the print instruction number (X) is compared with the threshold value N of the post-processing apparatus, and in a case in which X>N, ACT 3 is taken, and in a case in which X≤N, ACT 11 is taken. In the present embodiment, it is exemplified that X and N meet the following condition: N<X≤2N.

In ACT 3, to divide the printed paper Q into the first paper bundle B1 and the second paper bundle B2, the printing numbers n (the printing number of the first paper bundle B1 is n1, the printing number of the second paper bundle B2 is n2) (n≤N) of the paper bundles are calculated, and then ACT 4 is taken.

In ACT 4, a print instruction is given, the printing processing is started, and then the printed paper Q is discharged from the image forming apparatus 100 to the post-processing apparatus 1 (ACT 5), and then ACT 6 is taken.

The number X' of the discharged printed paper Q is counted by the discharged paper number counter section 19, and it is determined whether or not the number X' reaches the set number n (n1) of the first paper bundle B1 in ACT 6, and if it does, ACT 7 is taken.

In ACT 7, the n1 sheets of paper Q stacked on the first processing tray 11 are subjected to the needle binding processing by the stapling section 13 to form the first paper bundle B1, and then ACT 8 is taken.

In ACT 8, it is determined whether or not there is a paper bundle placed on the second processing tray 12 based on the detection information of the paper bundle existence sensor 122. In a case in which there is a paper bundle, ACT 12 is taken, otherwise, ACT 9 is taken.

In ACT 9, the first paper bundle B1 is discharged to the second processing tray 12, and then ACT 10 is taken.

In ACT 10, X' is reset, and the printing paper number n compared in ACT 6 is changed from n1 to n2, then the flow returns to ACT 5, and then ACT 6 is taken. In ACT 6, the number X' of the discharged printed paper Q is counted by the discharged paper number counter section 19, and it is determined whether or not the number X' reaches the set number n (n2) of the second paper bundle B2, and if it does, ACT 7 is taken. In ACT 7, the paper Q stacked on the first processing tray 11 are subjected to the stapling processing to form the second paper bundle B2 bound with the staple S. In ACT 8, as the first paper bundle B1 is already placed on the second processing tray 12, thus, ACT 12 is taken.

In ACT 12, the gluing processing is carried out on the first paper bundle B1 by the paper bundle gluing section 14, and then ACT 13 is taken.

In ACT 13, the second paper bundle B2 is discharged from the first processing tray 11 to the second processing tray 12, and then ACT 14 is taken.

In ACT 14, the second processing tray 12 is lowered, and then ACT 15 is taken.

In ACT 15, the second paper bundle B2 is pressed against the first paper bundle B1 by the paper bundle pressing section 16, and the first paper bundle B1 and the second paper bundle B2 are bound through the glue G, and then ACT 16 is taken.

In ACT 16, the paper bundle B3 subjected to the glue binding processing is discharged to the paper discharge tray 15, and then ACT 17 is taken.

In ACT 17, the second processing tray 12 is lifted up to the standby position, and then the present processing is terminated.

On the other hand, if it is determined in ACT 2 that X≤N, there is no need to divide the printed paper bundle into a plurality of paper bundles, thus, in ACT 11, the paper Q stacked on the first processing tray 11 is subjected to the stapling processing, conveyed to the second processing tray 12, and then discharged to the paper discharge tray 15, and then the present processing is terminated.

In addition, as a pressing section for applying pressure force to carry out glue binding on the paper bundle, the paper bundle pressing section 16 presses the top surface of the second paper bundle B2 against the first paper bundle B1 and applies the pressure force to carry out glue binding. However, the pressing section is not limited to the paper bundle pressing section 16. For example, the pressure force may be applied from two sides in the vertical direction to the first paper bundle B1 and the second paper bundle B2 between which the glue G is adhered; alternatively, a plate may be arranged above the second paper bundle B2, and the pressure force may be applied upwards from the lower surface of the first paper bundle B1.

(A Second Embodiment)

The second embodiment is described with reference to FIG. 7 and FIG. 8.

In the first embodiment, the first paper bundle B1 and the second paper bundle B2 are subjected to needle binding processing, and then the first paper bundle B1 and the second paper bundle B2 are bound into one bundle through the glue binding processing. On the contrary, the second embodiment is different from the first embodiment in the point where each page of the first paper bundle B1 and the second paper bundle B2 is subjected to glue binding processing.

Different from the constitution shown in FIG. 1, a page gluing section and a page pressing section are arranged in the second embodiment instead of the stapling section 13. The page gluing section is structurally identical to the paper bundle gluing section 14, and the page pressing section is structurally identical to the paper bundle pressing section 16.

Figure 7:
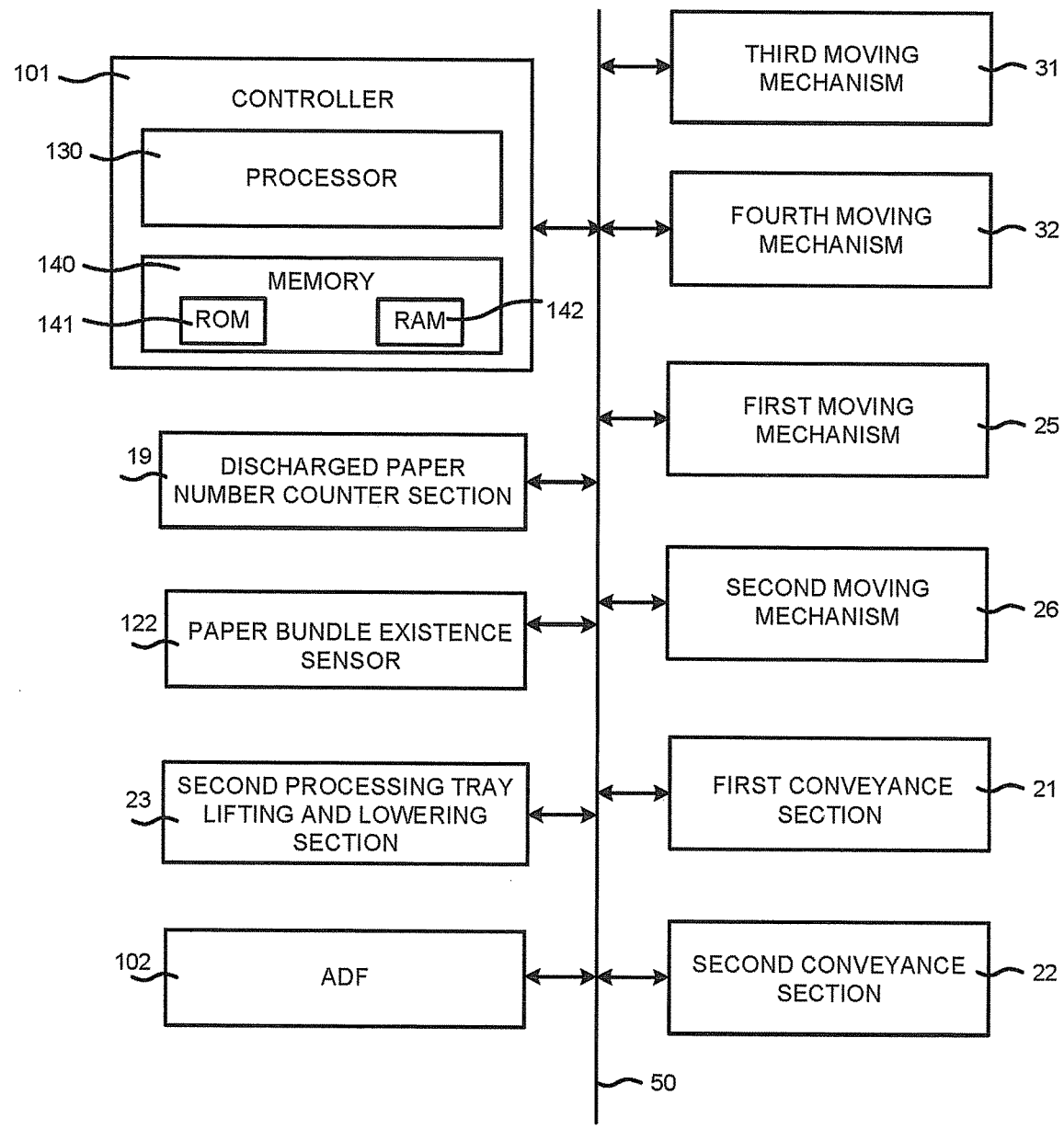
FIG. 7 is a block diagram illustrating the hardware constitution of a post-processing apparatus according to a second embodiment.
Figure 8:
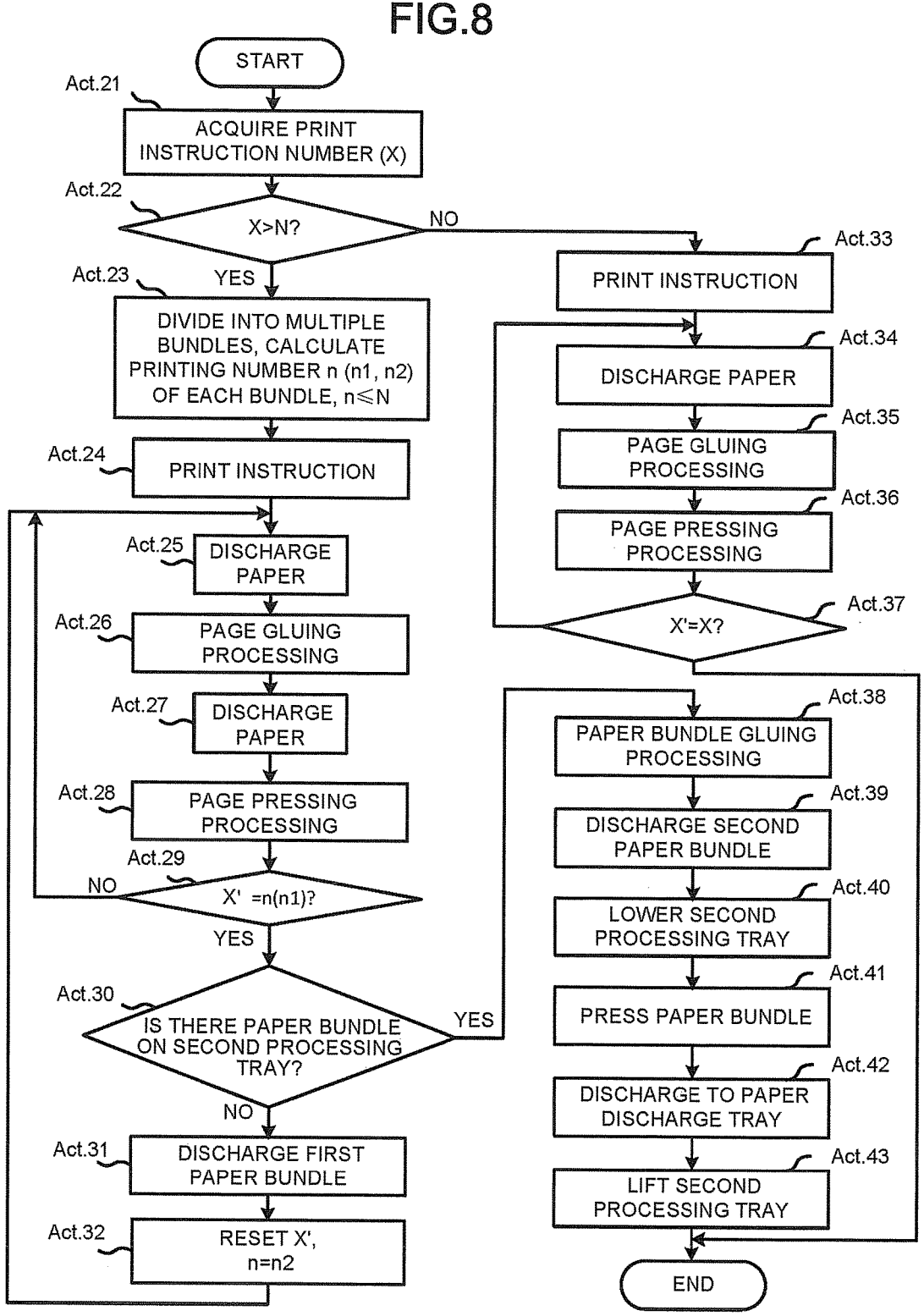
FIG. 8 is a flowchart illustrating post-processing carried out through the hardware constitution shown in FIG. 7.

Different from FIG. 5, a third moving mechanism 31 for moving the page gluing section and a fourth moving mechanism 32 for moving the page pressing section are newly arranged in FIG. 7 instead of the stapling section 13. The third moving mechanism 31 and the fourth moving mechanism 32 are controlled by the controller 101.

In the second embodiment, the paper Q is fed to the first processing tray 11 one by one. The paper Q fed to the first processing tray 11 is placed with the printed surface (a case of simplex printing) facing downwards, and gluing processing is carried out on the back side of the paper Q. The page gluing section carries out gluing processing on the corner of the rear end in the conveyance direction of the paper Q, on a plurality of positions in the width direction, or on a belt-like area along the width direction, under the moving control of the third moving mechanism 31.

When the next paper Q is placed on the paper Q adhered with the glue G, the page pressing section contacts with and presses the upmost paper Q. The page pressing section presses the position corresponding to the gluing section to adhere the paper Q to the glue G under the moving control of the fourth moving mechanism 32.

The post-processing carried out in the second embodiment is described with reference to the flowchart shown in FIG. 8.

In ACT 21, the print instruction number (X) is acquired, and then ACT 22 is taken.

In ACT 22, the print instruction number (X) is compared with the threshold value N of the post-processing apparatus, and in a case in which X>N, ACT 23 is taken, and in a case in which X≤N, ACT 33 is taken. In the present embodiment, it is exemplified that X and N meet the following condition: N<X2N.

In ACT 23, to divide the printed paper Q into the first paper bundle B1 and the second paper bundle B2, the printing numbers n (the printing number of the first paper bundle B1 is n1, the printing number of the second paper bundle B2 is n2) (n≤N) of the paper bundles are calculated, and then ACT 24 is taken.

In ACT 24, a print instruction is given, the printing processing is started, and then the printed paper Q is discharged from the image forming apparatus 100 to the post-processing apparatus 1 (ACT 25), and then ACT 26 is taken.

In ACT 26, the third moving mechanism 31 is controlled to carry out gluing processing on a given position of the paper Q placed on the first processing tray 11 with the page gluing section, and then ACT 27 is taken.

In ACT 27, the next paper Q is discharged and placed on the paper Q subjected to the page gluing processing, and then ACT 28 is taken.

In ACT 28, the fourth moving mechanism 32 is controlled to carry out pressing processing for the glue binding with the page pressing section, and then ACT 29 is taken.

In ACT 29, the number X' of the discharged printed paper Q is counted by the discharged paper number counter section 19, and the glue binding processing in ACT 25-ACT 28 is executed repeatedly until the number X' reaches the set number n (n1) of the first paper bundle B1, and then ACT 30 is taken. That is, glue binding processing is carried out on the n1 sheets of paper Q stacked on the first processing tray 11 to form the first paper bundle B1, and then ACT 30 is taken.

In ACT 30, it is determined whether or not the first paper bundle B1 is placed on the second processing tray 12 based on the detection information of the paper bundle existence sensor 122. In a case in which the first paper bundle B1 is placed on the second processing tray 12, ACT 38 is taken, otherwise, ACT 31 is taken.

In ACT 31, the first paper bundle B1 is discharged to the second processing tray 12, and then ACT 32 is taken.

In ACT 32, X' is reset, and the printing paper number n compared in ACT 29 is changed from n1 to n2, then the flow returns to ACT 25, and then ACT 26 is taken to carry out glue binding processing on the second paper bundle B2. To form the second paper bundle B2 through glue binding processing, the processing in ACT 25-ACT 29 is executed until the binding number reaches n2, and then ACT 30 is taken.

In ACT 30, as the first paper bundle B1 is already placed on the second processing tray 12, thus, ACT 38 is taken.

In ACT 38, the gluing processing is carried out on the first paper bundle B1 by the paper bundle gluing section 14, and then ACT 39 is taken.

In ACT 39, the second paper bundle B2 is discharged from the first processing tray 11 to the second processing tray 12, and then ACT 40 is taken.

In ACT 40, the second processing tray 12 is lowered, and then ACT 41 is taken.

In ACT 41, the second paper bundle B2 is pressed against the first paper bundle B1 by the paper bundle pressing section 16, and the first paper bundle B1 and the second paper bundle B2 are bound through the glue G, and then ACT 42 is taken.

In ACT 42, the paper bundle B3 subjected to the glue binding processing is discharged to the paper discharge tray 15, and then ACT 43 is taken.

In ACT 43, the second processing tray 12 is lifted up to the standby position, and then the present processing is terminated.

On the other hand, if it is determined in ACT 22 that X≤N, there is no need to divide the printed paper bundle, thus, in ACT 33, the print instruction is given, and in ACT 34-ACT 37, the gluing processing is carried out on each paper Q discharged one by one to the first processing tray 11, and when the counted number reaches the print instruction number, the paper Q is conveyed to the second processing tray 12 and then discharged to the paper discharge tray 15, and then the present processing is terminated.

In accordance with the second embodiment, the binding processing carried out on the first paper bundle B1 and the second paper bundle B2 on the first processing tray 11 is the glue binding processing in which no staple is used. Further, the binding processing carried out on the second processing tray 12 for binding the first paper bundle B1 and the second paper bundle B2 together is also the glue binding processing in which no staple is used. In this way, a paper bundle with no staple can be obtained.

The "glue" in the present embodiment is not intended to be limited to solid type. For example, the glue may be a semi-solid type such as a gel type and the like, a liquid type or gaseous type. That is, any material is applicable as long as it can adhere paper to paper through glue.

While certain embodiments have been described, these embodiments have been presented by way of example only, and are not intended to limit the scope of the invention. Indeed, the novel embodiments described herein may be embodied in a variety of other forms; furthermore, various omissions, substitutions and changes in the form of the embodiments described herein may be made without departing from the spirit of the invention. The accompanying claims and their equivalents are intended to cover such forms or modifications as would fall within the scope and spirit of the invention.

What is claimed is:

1. A post-processing apparatus comprising:
   a needle binding section configured to create a first paper bundle by binding papers with a needle;
   a gluing section configured to carry out gluing processing at the upmost paper of the first paper bundle;
   a tray configured to stack the first paper bundle;
   a transfer section configured to transfer the first paper bundle to the tray;
   a pressing section configured to press the top first paper bundle of the first paper bundles stacked on the tray; and
   a controller configured to divide the number of paper subjected to binding process into a plurality of groups,
      and to create the first paper bundle by binding papers with the needle by the needle binding section for each group,
      and to transfer the first paper bundle of the first group to the tray by the transfer section and carry out gluing processing at the first paper bundle,
      and to transfer the first paper bundle to the tray and press the top first paper bundle of the first paper bundles stacked on the tray by the pressing section and carry out gluing processing at the top of first paper bundle every the first paper bundle from the first paper bundle of the second group to the first paper bundle of the second to the last group,
      and to transfer the first paper bundle of the last group to the tray,
      and create a second bundle by pressing the top first paper bundle to glue bind the first paper bundles.

2. The post-processing apparatus according to claim 1, further comprising:
   a paper sensor configured to detect paper;
   wherein the control section, responsive to the paper sensor detecting paper, acquires the number of paper subjected to binding process, and divides the acquired paper number into a plurality of groups, and creates the second bundle by glue binding the first paper bundles created for each group in a case in which the acquired paper number exceeds a preset threshold value, the control section binds the papers of the acquired paper number by the paper binding section in a case in which the acquired paper number does not exceed the preset threshold value.

3. The post-processing apparatus according to claim 1, further comprising:
   a paper sensor;
   wherein the control section, responsive to the paper sensor, feeds paper one by one to the paper binding section and creates the first paper bundle by the paper binding section whenever the number of sheets fed to the paper binding section reaches a predetermined number.

4. A post-processing method for binding fed paper, comprising:
   creating a first paper bundle by binding papers with a needle;
   carrying out gluing processing at the upmost paper of the first paper bundle from the first paper bundle and stacking the first paper bundle;
   transferring the first paper bundle to a tray;
   pressing the top first paper bundle of the first paper bundles stacked on the tray;
   dividing the number of paper subjected to binding process into a plurality of groups;
   creating the first paper bundle by binding papers with the needle for each group,
   transferring the first paper bundle of the first group to the tray and carrying out gluing processing at the first paper bundle,
   transferring the first paper bundle to the tray and pressing the top first paper bundle of the first paper bundles stacked on the tray and carrying out gluing processing at the top of first paper bundle every the first paper bundle from the first paper bundle of the second group to the first paper bundle of the second to the last group,
   transferring the first paper bundle of the last group to the tray, and
   creating a second bundle by pressing the top first paper bundle to glue bind the first paper bundles.

5. The post-processing method according to claim 4, wherein feeding paper one by one and creating the first paper bundle whenever the number of sheets fed reaches predetermined number.

6. A post-processing apparatus comprising:
   a glue binding section configured to create a first paper bundle by binding papers with glue;
   a gluing section configured to carry out gluing processing at the upmost paper of the first paper bundle;
   a tray configured to stack the first paper bundles;
   a transfer section configured to transfer the first paper bundle to the tray;
   a pressing section configured to press the top first paper bundle of the first paper bundles stacked on the tray; and
   a controller configured to divide the number of paper subjected to binding process into a plurality of groups,
      and to create the first paper bundle by binding papers with glue by the glue binding section for each group,
      and to transfer the first paper bundle of the first group to the tray by the transfer section and carry out gluing processing at the first paper bundle,
      and to transfer the first paper bundle to the tray and press the top first paper bundle of the first paper bundles stacked on the tray by the pressing section and carry out gluing processing at the top first paper bundle every the first paper bundle from the first paper bundle of the second group to the first paper bundle of the second to the last group,
      and to transfer the first paper bundle of the last group to the tray,
      and create a second bundle by pressing the top first paper bundle to glue bind the first paper bundles.

7. A post-processing method comprising:
   creating a first paper bundle by binding papers with glue;
   gluing at the upmost paper of the first paper bundle;
   stacking the first paper bundles;
   transferring the first paper bundle to a tray;
   pressing the top first paper bundle of the first paper bundles stacked on the tray;

dividing the number of paper subjected to binding process into a plurality of groups;
creating the first paper bundle by binding papers with glue for each group;
transferring the first paper bundle of the first group to the tray and gluing at the first paper bundle;
transferring the first paper bundle to the tray and press the top first paper bundle of the first paper bundles stacked on the tray and gluing at the top first paper bundle every the first paper bundle from the first paper bundle of the second group to the first paper bundle of the second to the last group;
transferring the first paper bundle of the last group to the tray; and
creating a second bundle by pressing the top first paper bundle to glue bind the first paper bundles.

\* \* \* \* \*